United States Patent
Chen

(10) Patent No.: US 6,742,268 B2
(45) Date of Patent: Jun. 1, 2004

(54) STRUCTURE OF A HAND-SAW

(76) Inventor: Chun-Chiung Chen, PO Box 82-144, Taipei (TW)

( * ) Notice: Subject to any disclaimer, the term of this patent is extended or adjusted under 35 U.S.C. 154(b) by 0 days.

(21) Appl. No.: 10/274,232

(22) Filed: Oct. 21, 2002

(65) Prior Publication Data
US 2004/0074099 A1 Apr. 22, 2004

(51) Int. Cl.⁷ .......................... B27B 21/00; B27B 21/06
(52) U.S. Cl. ........................................... 30/519; 30/507
(58) Field of Search ..................... 30/519, 507, 509, 30/513, 501, 510, 517

(56) References Cited
U.S. PATENT DOCUMENTS

| | | | | | |
|---|---|---|---|---|---|
| 2,715,426 A | * | 8/1955 | Morris | ......................... | 30/508 |
| 2,880,773 A | * | 4/1959 | Contreras | ..................... | 30/510 |
| 3,822,731 A | * | 7/1974 | Keymer | ........................ | 30/513 |
| 3,840,059 A | * | 10/1974 | Ingro | ........................... | 30/514 |
| 4,079,763 A | * | 3/1978 | Riley | ........................... | 30/508 |

* cited by examiner

Primary Examiner—Douglas D. Watts
(74) Attorney, Agent, or Firm—Leong C. Lei

(57) ABSTRACT

An improved structure of a hand-saw having adjustable sawing blade includes two holding sections, a front and a rear holding section, a sawing blade, a front-mounted ratchet teeth fine tuning block having one end with four teeth ratchet, the other end thereof being a semicircular and having a protruded cylindrical bar for the insertion of the sawing blade, a ratchet teeth adjusting sleeve being cylindrical shape having one end with inner edge being ratchet teeth shape, and the other end thereof being a larger internal radius, a rear-mounted ratchet wheel fine tuning block having an external edge with four ratchet teeth for engagement with the ratchet-teeth adjusting sleeve for the insertion of the other end of the sawing blade, a hexagonal pull-push engaging connector module having a circular shape center and a cavity adaptable to a hexagonal shape screw nut, a loosening button located at the root section of the rear holding section being an arch-shaped body and having a gripping section provided with a recessed arch for better gripping in the course of turning the button, thereby the button is used to adjust the fine tune angle of the hexagonal screw nut.

9 Claims, 10 Drawing Sheets

STRUCTURE OF A HAND-SAW

BACKGROUND OF THE INVENTION (a) Technical Field of the Invention

The present invention relates to a hand-saw, and in particular, to a hand-saw having an adjustable sawing blade.

(b) Description of the Prior Art

Taiwanese Patent Publication No. 242802 and No. 232173 entitled "An adjustable device for sawing blade" and No. 331206 entitled "Retractable device for sawing blade" make use of compression spring to position the sawing blade and make use of the rotatable nut at the front end of the holding section of the adjustable portion to adjust the desired angle of the sawing blade. The drawback of this conventional adjustable device for the sawing blade is that the shape is not streamlined and the front end of the entire structure is a restriction to a limited space. Accordingly, it is an object of the present invention to provide a hand-saw having an adjustable sawing blade.

SUMMARY OF THE INVENTION

Accordingly, it is an object of the present invention to provide an improved structure of a hand-saw having adjustable sawing blade comprising two holding sections, a front and a rear holding section, the lower end of the front section being a circular hole having provided with a plurality of ratchet teeth at the internal edge thereof and the bottom section of the rear holding section being provided with a cavity, and an interlinking rod connected the front and the rear holding section; a sawing blade; a front-mounted ratchet teeth fine tuning block having one end with four teeth ratchet, the other end thereof being a semicircular and having a protruded cylindrical bar for the insertion of the sawing blade; a ratchet teeth adjusting sleeve being cylindrical shape having one end with inner edge being ratchet teeth shape, and the other end thereof being a larger internal radius; a rear-mounted ratchet wheel fine tuning block having an external edge with four ratchet teeth for engagement with the ratchet-teeth adjusting sleeve for the insertion of the other end of the sawing blade and the rear end section being extended to form a cylindrical section provided with a screw hole thereto; a hexagonal pull-push engaging connector module having a circular shape center and a cavity adaptable to a hexagonal shape screw nut, the protruded cylindrical pole being connected with a supplemental nut by a C-ring; a loosening button located at the root section of the rear holding section being an arch-shaped body and having a gripping section provided with a recessed arch for better gripping in the course of turning the button, thereby the button is used to adjust the fine tune angle of the hexagonal screw nut.

Yet another object of the present invention is to provide an improve structure of a hand-saw, wherein the numbers of ratchet teeth in the circular hole of the front holding section and the ratchet teeth adjusting sleeve are four, six, eight, ten, twelve to twenty-four.

A further object of the present invention is to provide an improve structure of a hand-saw, wherein the teeth number at the external edge of the front-mounted ratchet teeth adjusting block is one to twenty-four.

Another object of the present invention is to provide an improve structure of a hand-saw, wherein the number of teeth of the rear-mounted ratchet teeth fine turning block at the external edge is one to twenty-four.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
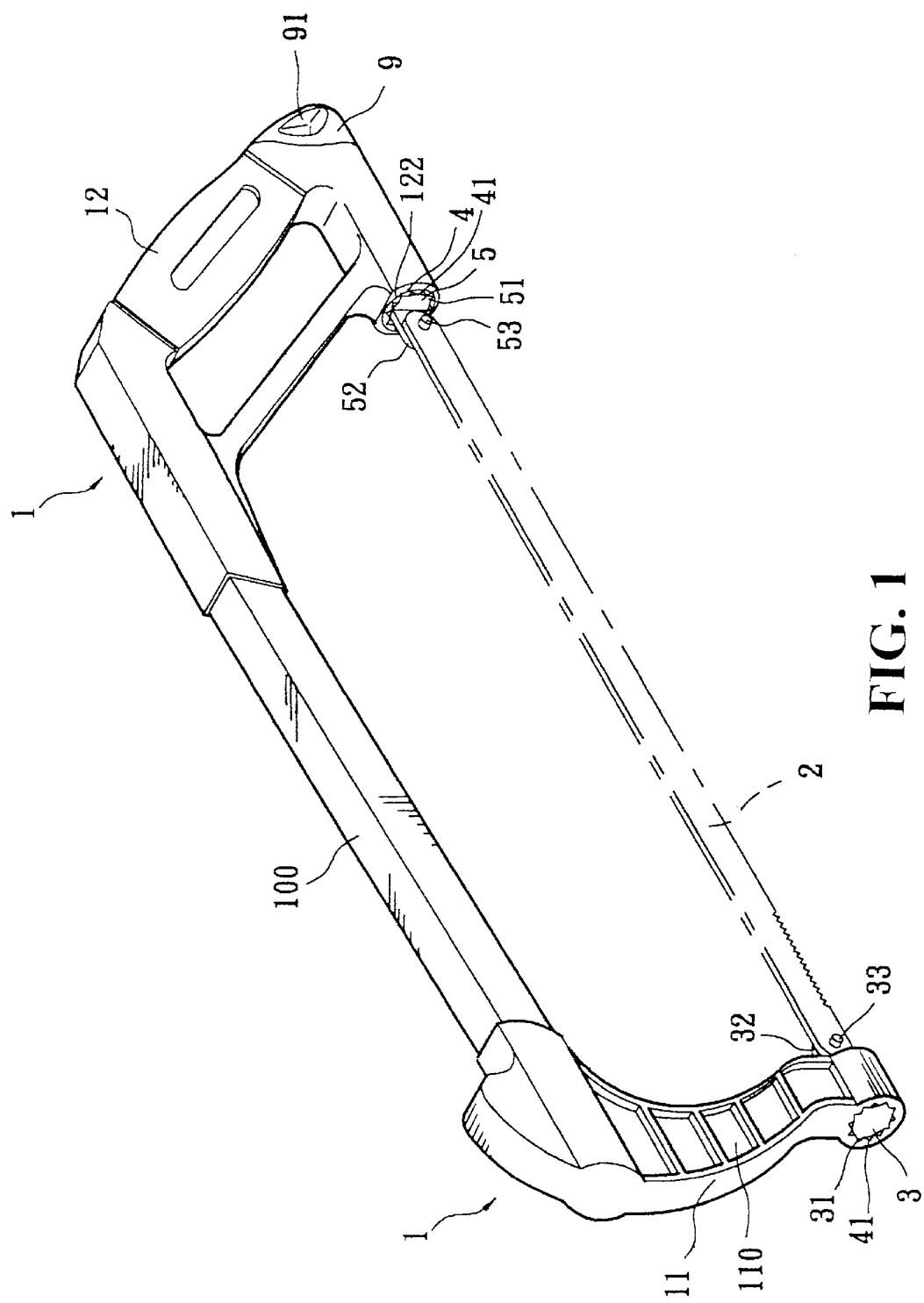
FIG. 1 is a perspective view of an improve structure of a hand-saw in accordance with the present invention.
Figure 2:
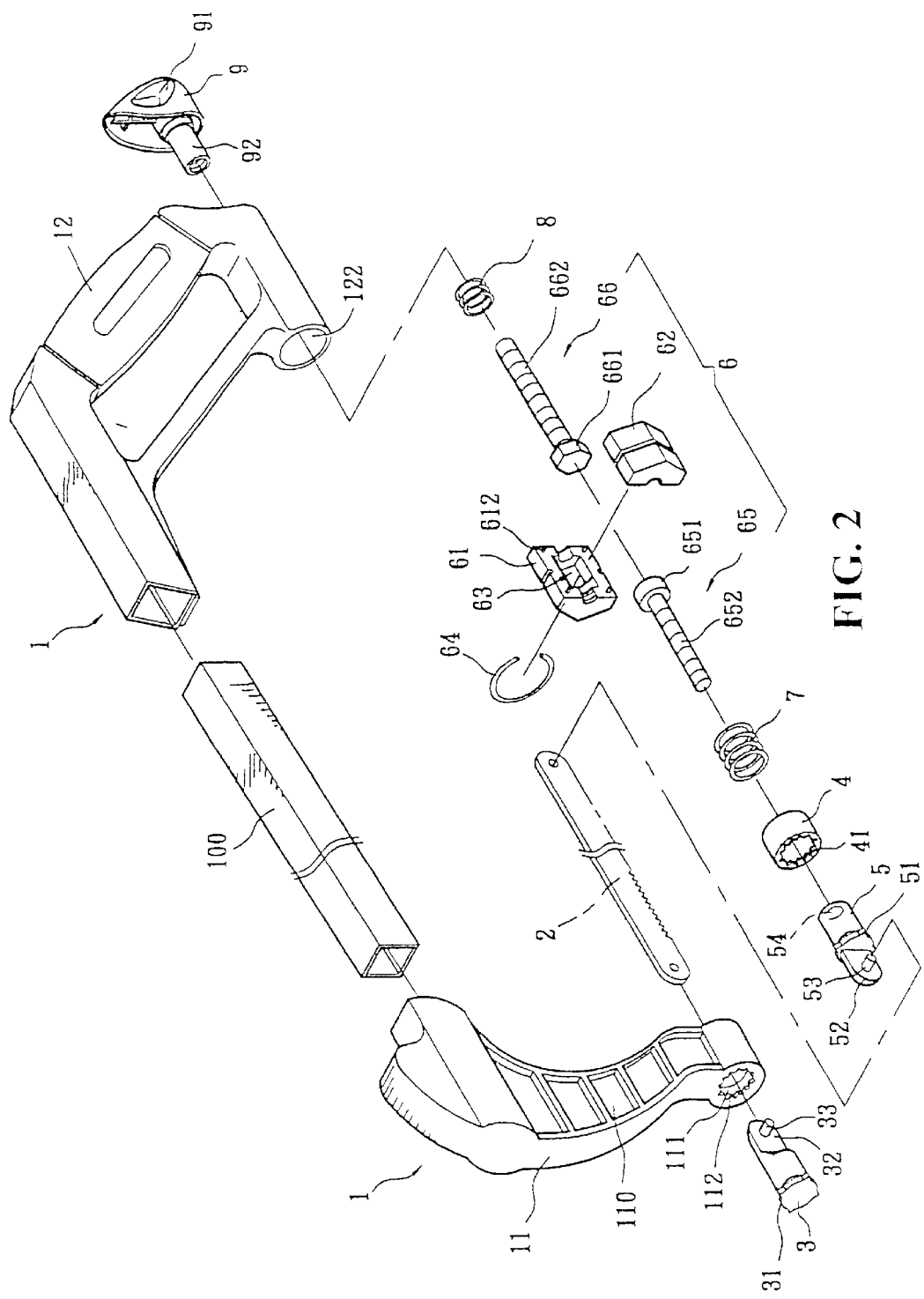
FIG. 2 is an exploded perspective view of an improve structure of a hand-saw in accordance with the present invention.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1, 2, 4, and 9, there is shown an improved structure of a hand-saw having adjustable sawing blade comprising two holding sections 1, a front 11 and a rear holding sections 12, the lower end of the front section 11 being a plurality of ornamental slot 110. The lower end of the front holding section 11 is a circular hole 111. A plurality of ratchet teeth 112 are provided to a single edge of the circular hole 111 at the internal edge thereof and the bottom section of the rear holding section 12 is provided with a cavity 122, and an interlinking rod 100 is used to connect the front 11 and the rear holding section 12.

Figure 3:
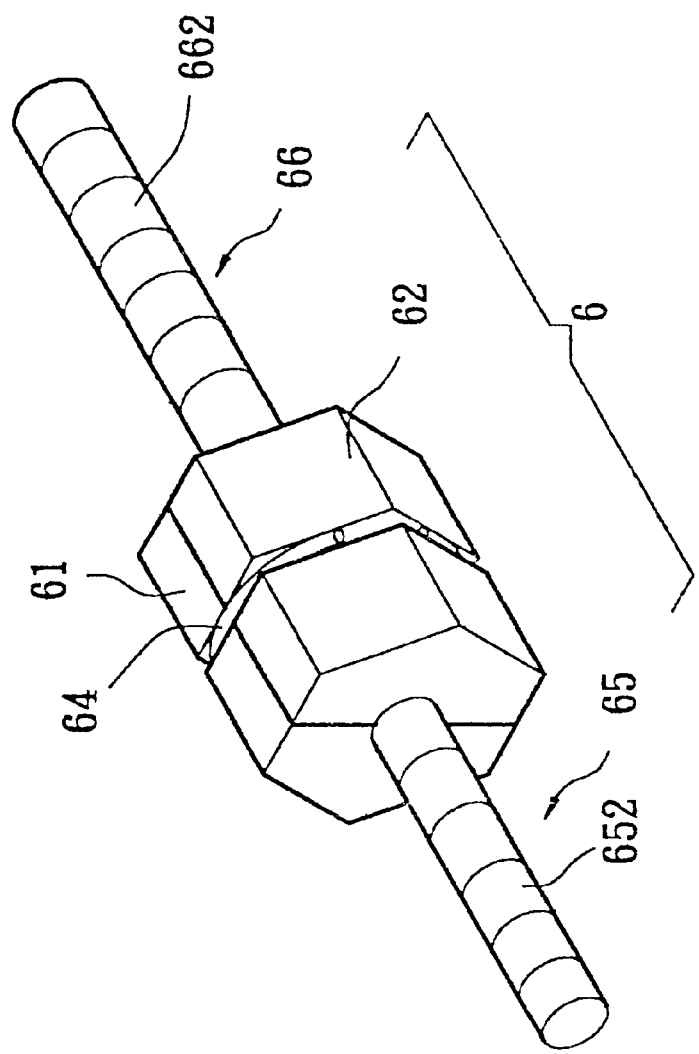
FIG. 3 is a perspective view of a hexagonal pull-push engaging connector in accordance with the present invention.
Figure 4:
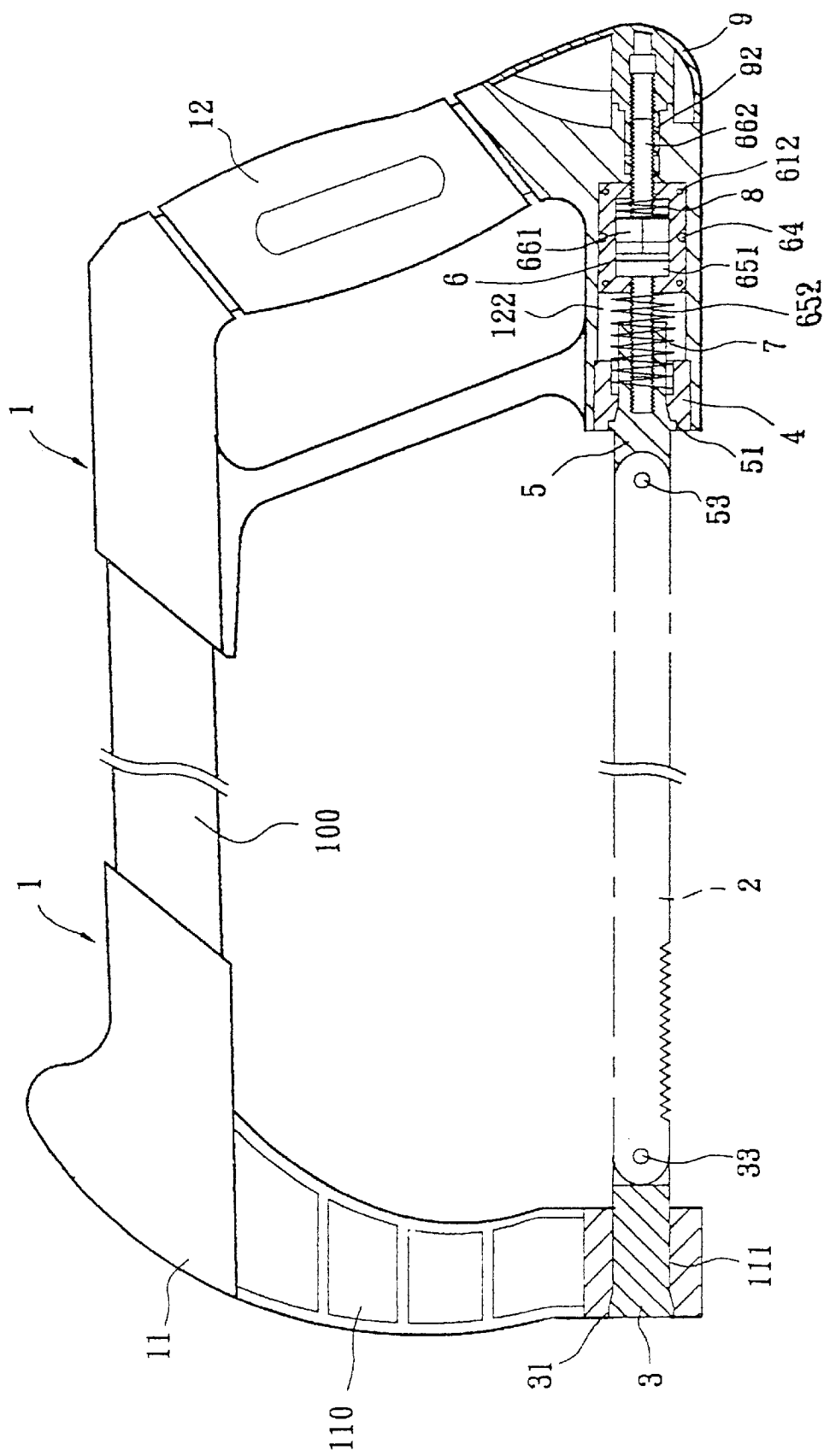
FIG. 4 is a horizontal view of the present invention.

The hand-saw further comprises a sawing blade 2; a front-mounted ratchet teeth fine tuning block 3 having one end with four teeth ratchet 31, the other end thereof being a semicircular arch 32 and having a protruded cylindrical bar 33 for the insertion of the sawing blade 2 at one end; a ratchet teeth adjusting sleeve 4 being cylindrical shape having one end with inner edge being ratchet teeth shape 41, and the other end thereof being a larger internal radius; a rear-mounted ratchet wheel fine tuning block 5 having an external edge with four ratchet teeth 51 for engagement with the ratchet-teeth adjusting sleeve 4 for the insertion of the other end of the sawing blade 2 and the rear end section 12 being extended to form a cylindrical section provided with a screw hole 54 thereto; a hexagonal pull-push engaging connector module 6 having a circular shape center and a cavity 63 adaptable to a hexagonal shape screw nut 66, the protruded cylindrical pole 612 being connected with a supplemental nut by a C-ring 64 for fastening (as shown in FIG. 3); a big compression spring 7 and a small compression spring 8; a loosening button 9 located at the root section of the rear holding section 12 being an arch-shaped body and having a gripping section 91 provided with a recessed arch for better gripping in the course of turning the button, thereby the button is used to adjust the fine tune angle of the hexagonal screw nut 66, as shown in FIG. 4.

Figure 5:
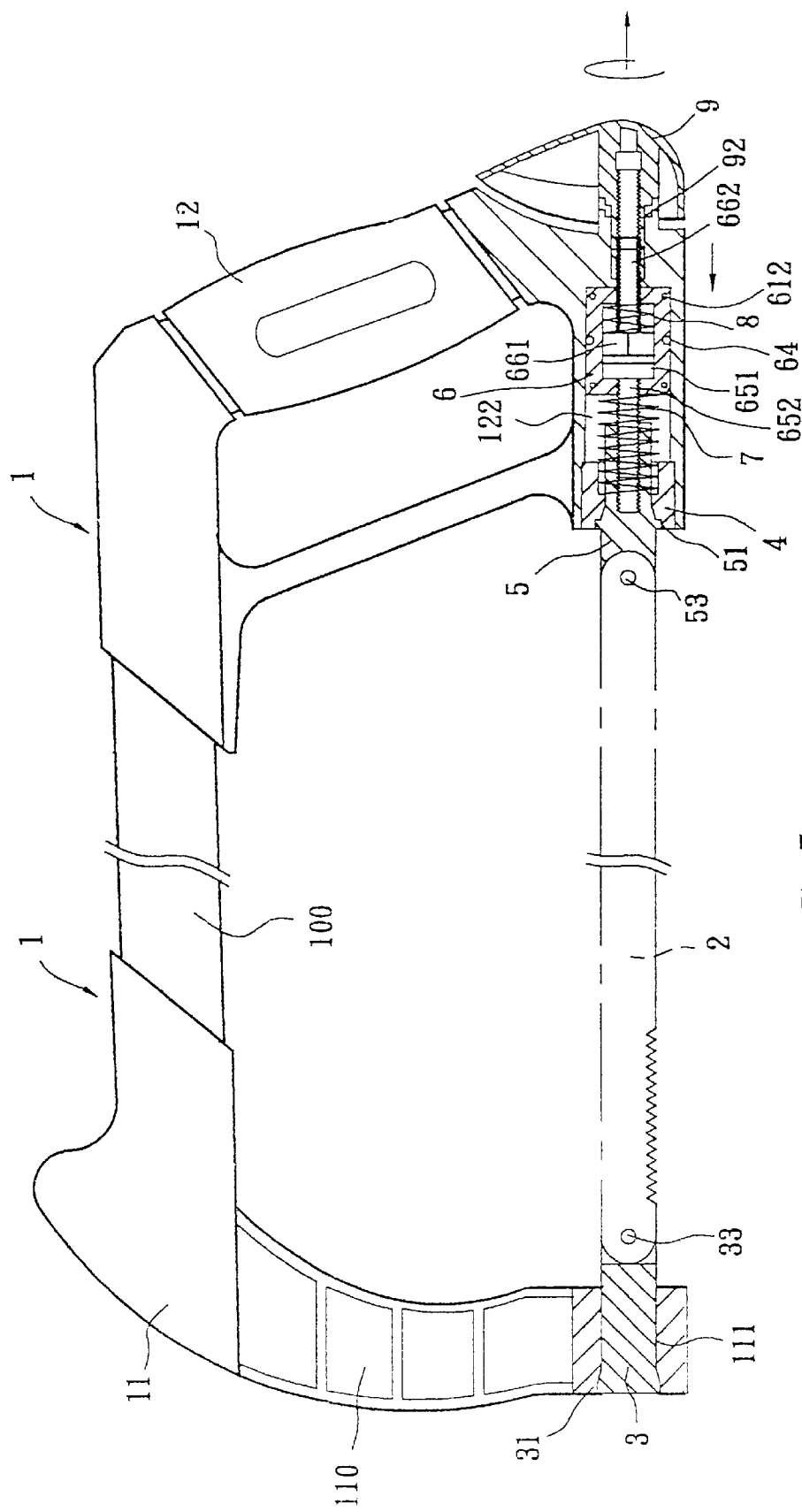
FIG. 5 is a horizontal sectional view of a preferred embodiment shown in FIG. 4 of the present invention.

FIG. 5 is another preferred embodiment in accordance with the present invention. When the sawing blade 2 is to be adjusted, the treaded pole 92 is loosen and the elastic force of the compression spring 8 urges the screw nut 651 of the circular screw nut 65 and the hexagonal screw nut 66 moves forward.

Figure 6:
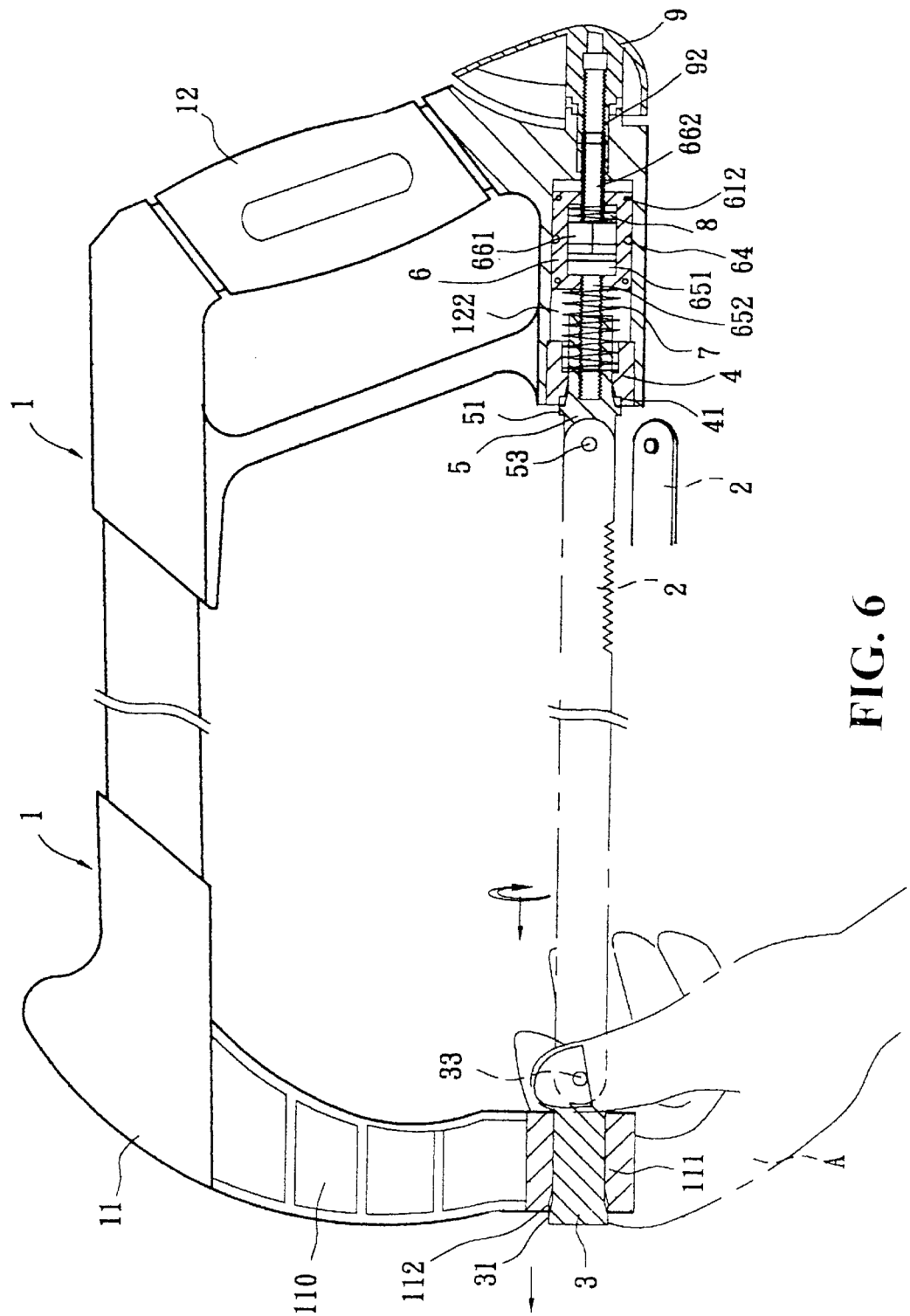
FIG. 6 is another horizontal sectional view of the preferred embodiment shown in FIG. 5.
Figure 7:
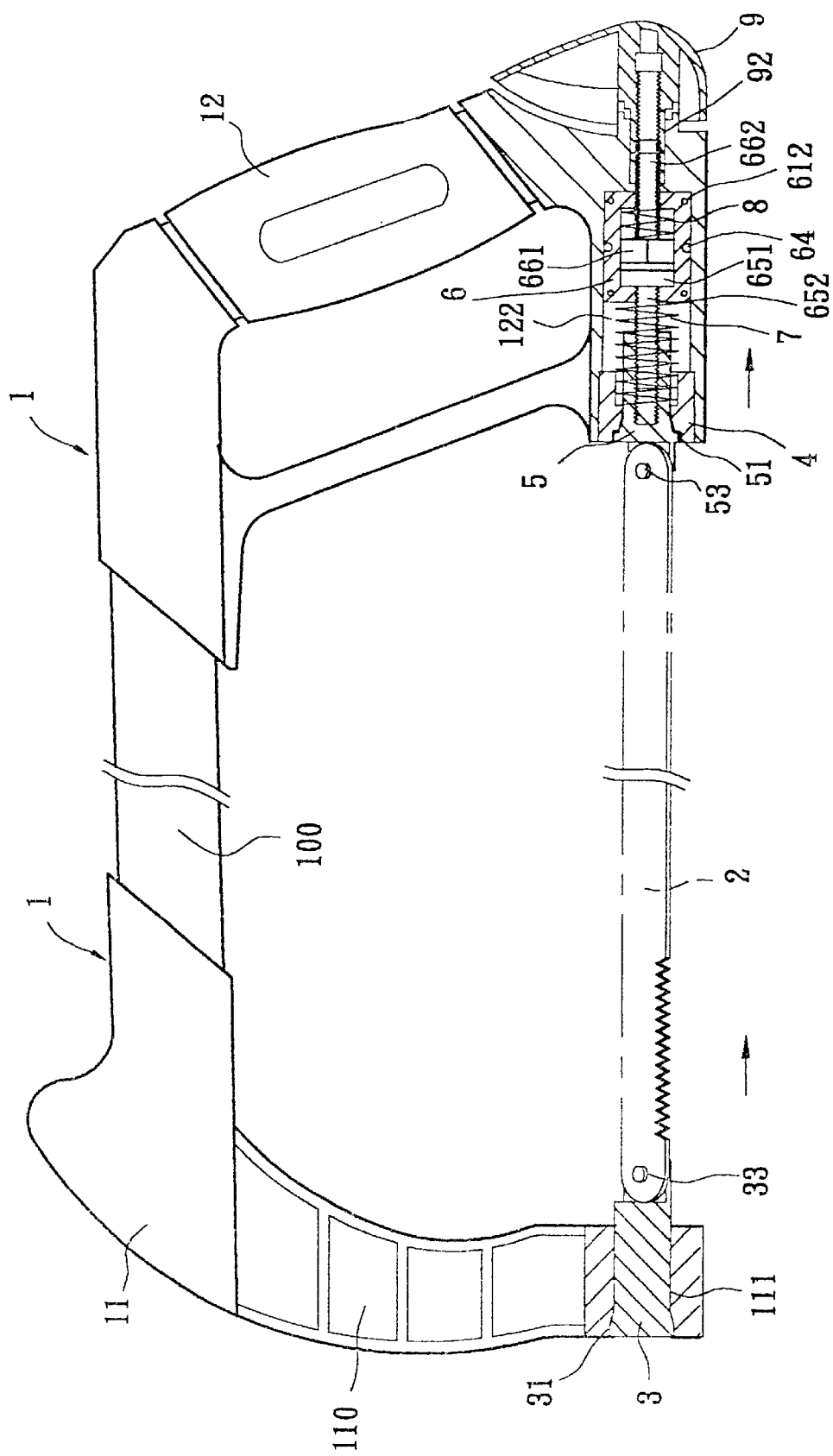
FIG. 7 is a further horizontal sectional view of the preferred embodiment shown in FIG. 6.
Figure 8:
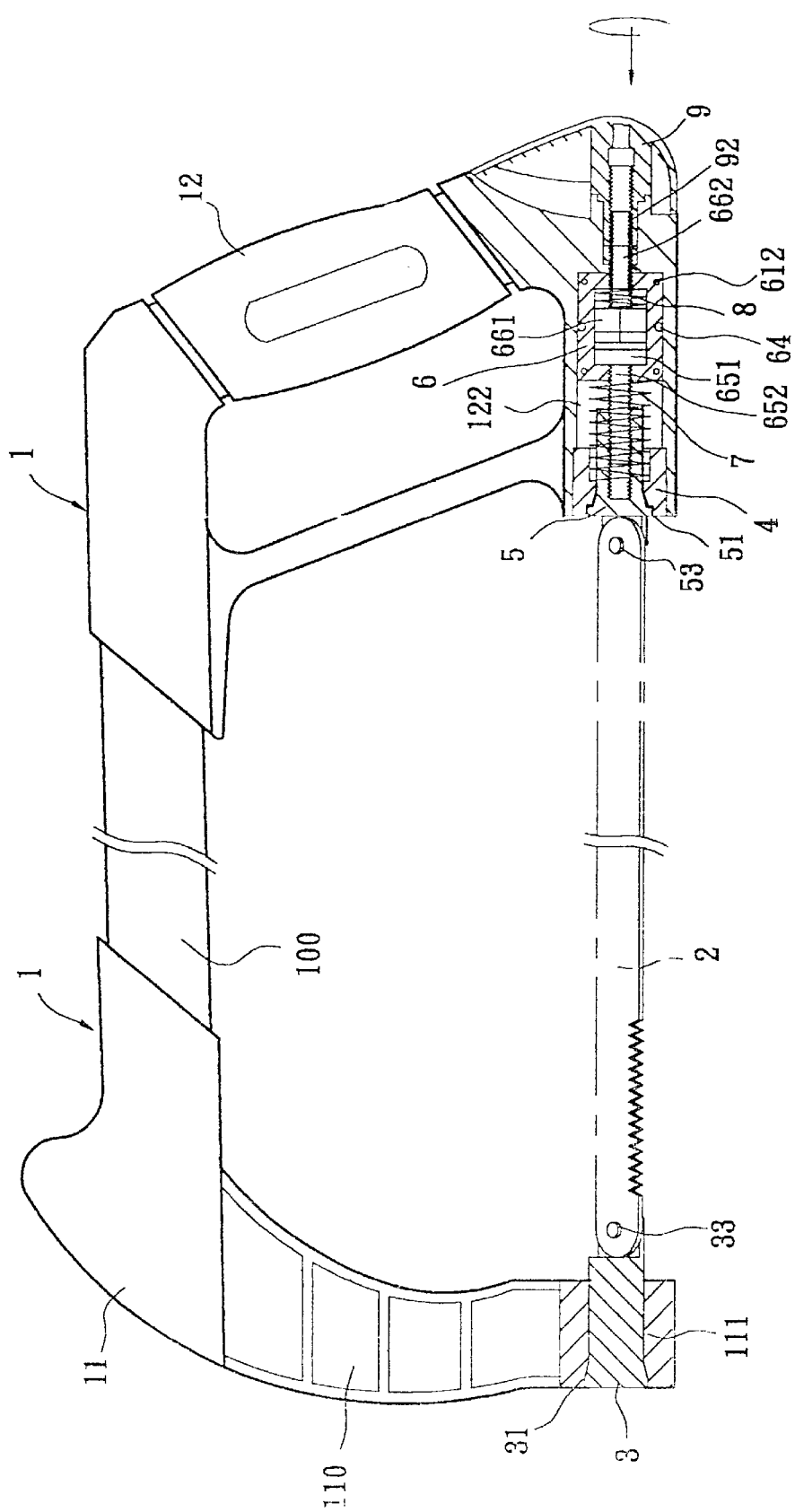
FIG. 8 is another horizontal sectional view of the preferred embodiment shown in FIG. 7.
Figure 9:
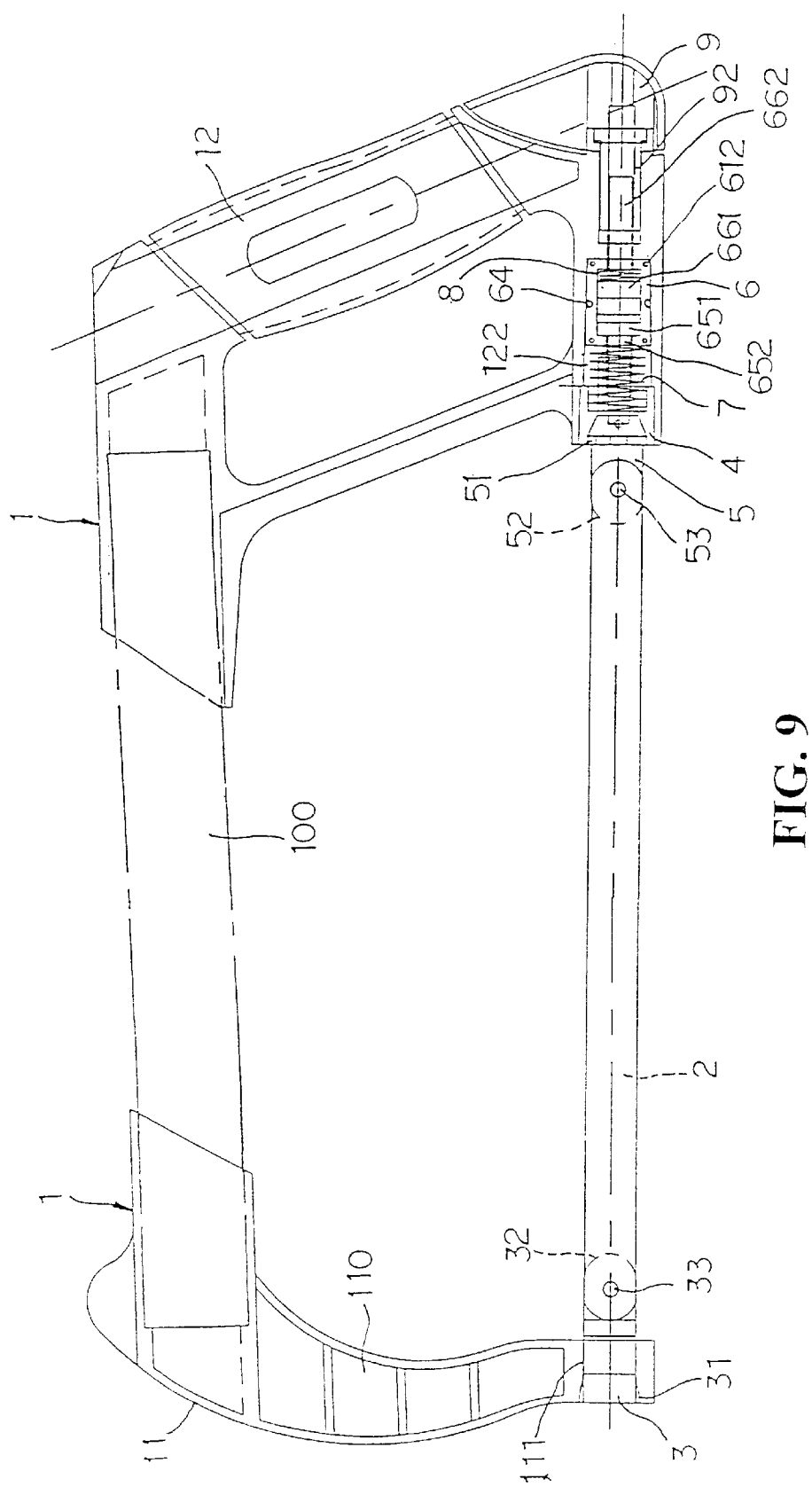
FIG. 9 is a schematic view showing the fabrication of parts in accordance with the present invention.

Referring to FIGS. 6 and 7, the hand section A is moved forward to pull forward the blade mounted onto the fine tuning block 3 and the rear fine tuning block 5. At this instance, the fine tuning block 5 moves the circular head screw nut 65 so as to push the connector 6 forward and is subjected to the resisting force of the compression spring 7. When the hand section A is adjusted to one corner, the compression spring 7 restores backward and push the connector module 6 to the original position. The ratchet teeth 31 of the fine tuning block 3 is engagement with the ratchet teeth 112 of the front holding section 11 and the ratchet teeth 51 of the rear fine tuning block 5 is engage with the ratchet teeth 41 of the sleeve 4. Thus, the loosing button 9 is rotated to become tight (as shown in FIG. 8).

Figure 11:
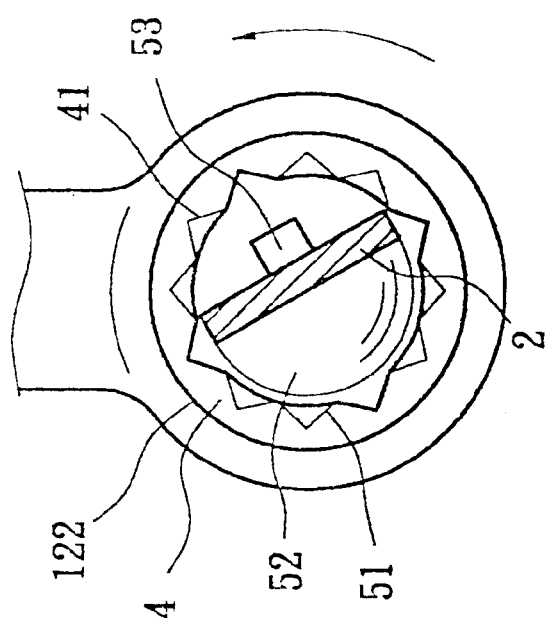
FIGS. 10 and 11 are schematic views showing an adjusted angle of the sawing blade in accordance with the present invention.
Figure 10:
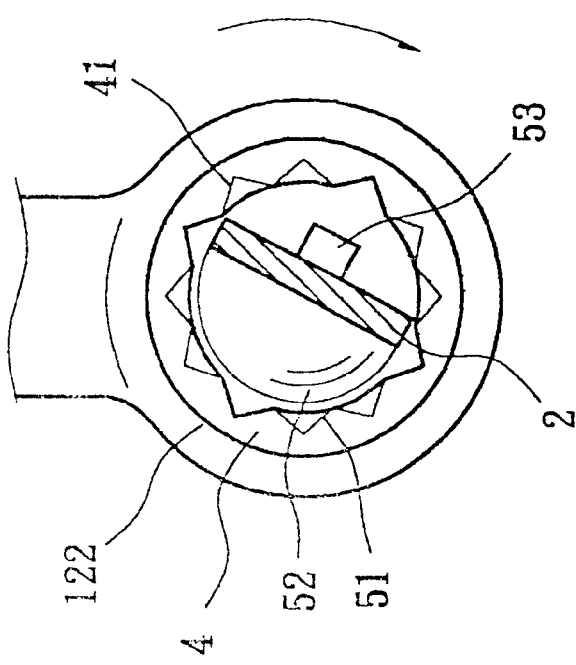

Referring to FIGS. 10, and 11, after the sawing blade 2 is adjusted, the compression spring 7 urges the sawing blade 2 and the front and rear fine tuning blocks 3, 5, and the ratchet teeth 31 of the front fine tuning block 3 is in engagement with the ratchet teeth 112 of the circular hole 111. The rear fine tuning block 5 at the other end is engaged with the ratchet teeth 41 of the sleeve 4.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An improved structure of a hand-saw having adjustable sawing blade comprising:

two holding sections, a front and a rear holding section, the lower end of the front section being a circular hole having provided with a plurality of ratchet teeth at the internal edge thereof and the bottom section of the rear holding section being provided with a cavity, and an interlinking rod connected the front and the rear holding section;

a sawing blade;

a front-mounted ratchet teeth fine tuning block having one end with four teeth ratchets, the other end thereof being a semicircular and having a protruded cylindrical bar for the insertion of the sawing blade;

a ratchet teeth adjusting sleeve being cylindrical shape having one end with inner edge being ratchet teeth shape, and the other end thereof being a larger internal radius;

a rear-mounted ratchet wheel fine tuning block having an external edge with four ratchet teeth for engagement with the ratchet-teeth adjusting sleeve for the insertion of the other end of the sawing blade and the rear end section being extended to form a cylindrical section provided with a screw hole thereto;

a hexagonal pull-push engaging connector module having a circular shape center and a cavity adaptable to a hexagonal shape screw nut, the protruded cylindrical pole being connected with a supplemental nut by a C-ring; and a loosening button located at the root section of the rear holding section being an arch-shaped body and having a gripping section provided with a recessed arch for better gripping in the course of turning the button, thereby the button is used to adjust the fine tune angle of the hexagonal screw nut.

2. The hand-saw of claim 1, wherein the numbers of ratchet teeth in the circular hole of the front holding section and the ratchet teeth adjusting sleeve are four, six, eight, ten, twelve to twenty-four.

3. The hand-saw of claim 1, wherein the teeth number at the external edge of the front-mounted ratchet teeth adjusting block is one to twenty-four.

4. The hand-saw of claim 1, wherein the number of teeth of the rear-mounted ratchet teeth fine turning block at the external edge is one to twenty-four.

5. The hand-saw of claim 1, wherein the hexagonal nut and the supplemental nut are provided with four, eight, ten and twelve sides.

6. The hand-saw of claim 1, wherein the head section cavity is provided with a circular head and a hexagonal screw and the screw heads of the two screws are mounted correspondingly into the pull-push engaging connector module.

7. The hand-saw of claim 1, wherein the outer edge of the screw 1 is inserted with a compression spring having a larger external radius to urge the larger inner radius of the ratchet teeth adjusting sleeve.

8. The hand-saw of claim 1, wherein the head section cavity is provided with a smaller compression spring, and the threaded end of the hexagonal screw is extended to an appropriate end.

9. The hand-saw of claim 1, wherein the gripping section of the loosening button is provided with a recess of various shape.

* * * * *